US006859341B2

(12) United States Patent
Min et al.

(10) Patent No.: US 6,859,341 B2
(45) Date of Patent: Feb. 22, 2005

(54) METHOD AND APPARATUS FOR FEEDFORWARD REPEATABLE RUNOUT COMPENSATION IN A SELECTED FREQUENCY RANGE

(75) Inventors: ShuangQuan Min, Singapore (SG); MingZhong Ding, Singapore (SG); KianKeong Ooi, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 133 days.

(21) Appl. No.: 10/396,074

(22) Filed: Mar. 25, 2003

(65) Prior Publication Data

US 2003/0193736 A1 Oct. 16, 2003

Related U.S. Application Data

(60) Provisional application No. 60/372,768, filed on Apr. 11, 2002.

(51) Int. Cl.$^7$ ............................................... G11B 5/596
(52) U.S. Cl. ................................................... 360/77.04
(58) Field of Search .......................... 360/77.04, 77.06, 360/78.09, 78.04, 75, 69

(56) References Cited

U.S. PATENT DOCUMENTS

| 5,978,169 | A | 11/1999 | Woods |
| 6,411,461 | B1 | 6/2002 | Szita |
| 6,437,936 | B1 | 8/2002 | Chen et al. |
| 6,487,035 | B1 | 11/2002 | Liu et al. |
| 6,594,106 | B1 * | 7/2003 | Serrano et al. .......... 360/78.09 |
| 2001/0043427 | A1 | 11/2001 | Chen et al. |

* cited by examiner

Primary Examiner—Andrew L. Sniezek
Assistant Examiner—Mitchell Slavitt
(74) Attorney, Agent, or Firm—David K. Lucenta; Derek J. Barger (57) ABSTRACT

For runout compensation in a data handling system, a servo feedback loop is configured to control a head position relative to a corresponding disc surface. Operation of the feedback loop is complicated by a repeatable error in the head position having energy at harmonics of the spindle rotation frequency. Also, the feedback loop has a gain with a frequency sensitivity in a target frequency range. A feedforward controller generates an output injected into the feedback loop based on an error-indicative input. This defines a feedforward closed-loop transfer function, between the loop output and the feedforward controller input. The feedforward controller prevents the frequency sensitivity from substantially varying the feedforward closed-loop transfer function gain and phase within the target frequency range, thus reducing computational burden.

28 Claims, 10 Drawing Sheets

METHOD AND APPARATUS FOR FEEDFORWARD REPEATABLE RUNOUT COMPENSATION IN A SELECTED FREQUENCY RANGE

CROSS-REFERENCE TO RELATED APPLICATIONS

This application claims the benefit of U.S. provisional application Ser. No. 60/372,768, filed Apr. 11, 2002, titled "Real-Time Adaptation of Repeatable Runout Compensation."

FIELD OF THE INVENTION

This application relates generally to data storage devices and more particularly to servo positioning in such devices.

BACKGROUND OF THE INVENTION

Disc drives are data storage devices that store digital data on a rotating disc. Modern disc drives, for example, comprise one or more rigid information storage discs that are coated with a magnetizable medium and mounted on the hub of a spindle motor for rotation at a constant high speed. Information is stored on the discs in a plurality of concentric circular tracks typically by an array of transducers mounted to a radial actuator for movement of the heads relative to the discs. During a data write operation sequential data is written onto the disc track, and during a read operation the head senses the data previously written onto the disc track and transfers the information to an external environment. Important to both of these operations is the accurate and efficient positioning of the head relative to the center of the desired track on the disc. Head positioning within a desired track is dependent on head-positioning servo patterns, i.e., a pattern of data bits recorded on the disc surface and used to maintain optimum track spacing and sector timing. Servo patterns or information can be located between the data sectors on each track of a disc ("embedded servo"), or on only one surface of one of the discs within the disc drive ("dedicated servo"). Regardless of whether a manufacturer uses "embedded" or "dedicated" servos, the servo patterns are typically recorded on a desired disc during the manufacturing process of the disc drive.

Recent efforts within the disc drive industry have focused on developing cost-effective disc drives capable of storing more data onto existing or smaller-sized discs. One potential way of increasing data storage on a disc surface is to increase the recording density of the magnetizable medium by increasing the track density (i.e., the number of tracks per inch). Increased track density requires more closely-spaced, narrow tracks and therefore enhanced accuracy in the recording of servo-patterns onto the desired disc surface. This increased accuracy requires that servo-track recording be accomplished within the increased tolerances, while remaining cost effective.

Servo patterns are typically recorded on the magnetizable medium of a desired disc by a servo-track writer ("STW") assembly during the manufacture of the disc drive. One STW assembly records a servo pattern on the discs following assembly of the disc drive. In this embodiment, the STW assembly attaches directly to a disc drive having a disc pack where the mounted discs on the disc pack have not been pre-recorded with a servo pattern. The STW does not use any heads of its own to write servo information onto the data surfaces, but uses the drive's own read/write heads to record the requisite servo pattern to mounted discs.

In light of the explosive trend toward higher track densities in recent years, some exceeding 100,000 tracks per inch, this method has become excessively time consuming. As the trend continues, it will apparently be necessary for every disc drive manufacturer to obtain and operate much larger numbers of STW's to maintain comparable numbers of disc drives. One strategy to mitigate this need is to utilize multi-disc "ex situ" STW's, which are capable of recording servo patterns to multiple discs mounted in a stack. After writing some of the position information using (dedicated) servo recording heads, sequentially or simultaneously, the discs are then removed and loaded into disc drives for use.

With any of these methods, substantial errors in the shapes and/or positions of tracks remain. Several compensation systems seek to correct such errors so that a head can follow a more circular path while reading and writing data. These systems rely on large numbers of embedded correction values called "Zero Acceleration Path" (ZAP) correction factors. Fully implemented, ZAP correction factors are very effective for adjusting track shapes. Unfortunately, such an implementation may cost too much, in light of current trends toward higher track density.

Similar problems are seen in other types of mass storage systems, such as floppy discs and video discs. Because these types of storage media are removed from and replaced onto a spindle, they also suffer from errors that repeat. In the frequency domain, this is manifested as energy concentrated at harmonics of the spindle rotation frequency.

All such data handling systems have servo feedback loops that have transfer functions with a gain and/or phase that is frequency sensitive. If there were an efficient mechanism for preventing this, at least in a target frequency range, more effective error compensation could occur without extensive computations such as conventional Discrete Fourier Transforms. It is to this and other problems that will become apparent in the document that follows, that the present invention is directed.

SUMMARY OF THE INVENTION

The present invention uses a feedforward controller configured to prevent such a feedback loop frequency sensitivity from substantially varying a feedforward closed-loop transfer function gain and/or phase in a desired frequency range. In one embodiment, a data handling system further includes a disc stack, a transducer head, and a servo feedback loop, any or all of which may be designed conventionally. The disc stack is configured to rotate at a predetermined spindle rotation speed, the predetermined speed defining a multiplicity of spindle harmonic frequencies. The transducer head has a position relative to the disc stack, which is the output of the servo feedback loop. This output is based on a loop input (reference signal) according to a predetermined feedback closed-loop transfer function having a gain with a frequency sensitivity. The feedforward controller is configured to generate a feedforward output based on a feedforward input. The feedforward input indicates a repeatable error in the transducer head's position. The feedforward output is configured to be injected into the servo loop so as to define a feedforward closed-loop transfer function between the loop output and the feedforward input. The feedforward controller includes a feedforward filter module configured to counteract the frequency sensitivity enough so that the feedforward closed-loop transfer function has a gain that remains within a predetermined 6 decibel range and/or has a phase that remains within a predetermined 90 degree range throughout a desired frequency range. More preferably, the phase range is 10 degrees or 6 degrees.

In an alternative embodiment, a method of the present invention includes a step of rotating a disc stack at a controlled speed. A servo feedback loop is arranged to control a loop output based on a loop input according to a predetermined feedback closed-loop transfer function having a gain with a frequency sensitivity. The loop output is a preferably a transducer head's position relative to the disc stack. The feedforward controller generates a feedforward output based on a feedforward input so that the feedforward input is indicative of an error in the transducer head's position. The feedforward output is injected into the servo loop so as to define a feedforward closed-loop transfer function between the loop output and the feedforward input. The feedforward controller is configured to counteract the frequency sensitivity enough so that the feedforward closed-loop transfer function has a gain and phase that remains within a predetermined variation range throughout a desired frequency range.

Additional features and benefits will become apparent upon reviewing the following figures and their accompanying detailed description.

DETAILED DESCRIPTION

Although the examples below show more than enough detail to allow those skilled in the art to practice the present invention, subject matter regarded as the invention is broader than any single example below. The scope of the present invention is distinctly defined, however, in the claims at the end of this document.

Numerous aspects of data storage device technology that are not a part of the present invention (or are well known in the art) are omitted for brevity, avoiding needless distractions from the essence of the present invention. For example, this document does not include specifics of how PES is manipulated in a conventional servo loop to control actuators that position transducer heads. Neither does it include specific methods for receiving, queuing, and executing user commands. Specific techniques for implementing transfer functions specified by formulae or Bode plots in circuitry or software are likewise omitted, typically being a matter of design choice to those of ordinary skill in servo controller design.

Definitions and clarifications of certain terms are provided in conjunction with the descriptions below, all consistent with common usage in the art but some described with greater specificity. A typical disc-based data storage system has a data storage disc that rotates at a controlled frequency during normal read/write operations. Energy in position error signal that is concentrated at harmonics (integer multiples) of this controlled frequency is called repeatable runout ("RRO"). Coherent RRO ("CRRO") is that portion of the RRO that is common for groupings of many adjacent tracks (e.g. in an annular zone).

As used in this document, a "frequency range" is a contiguous range of frequencies. A frequency range is "substantial" if it is (1) wider than 500 Hertz and/or (2) wide enough to span several harmonic frequencies of a dominant oscillation such as that of a rotating spindle. A gain variation is "substantial" if the gain varies by more than a predetermined value ±6 decibels, within a substantial target frequency range. A phase variation is "substantial" if the phase varies by more than a predetermined value ±45 degrees, within a substantial target frequency range. A transfer function has a gain with a "frequency sensitivity" if the gain has a net variation of more than 6 decibels within a substantial frequency range. A transfer function has a phase with a "frequency sensitivity" if the phase has a net variation of more than 90 degrees within a substantial frequency range. A frequency sensitivity in a primary signal path is "counteracted" if it is reduced or at least partially blocked from interfering with the operation of a secondary signal path. A "variation range" may be scalar-valued or vector-valued, depending on whether it limits one or more parameters (e.g. amplitude alone, or amplitude with phase).

A feedforward filter module's gain is "normalized" within a predetermined frequency range by adjusting the feedforward filter module input's closed-loop transfer function (to the system output) so as to reduce the ratio between the maximum gain and the minimum gain to an acceptable level. This can be implemented by adding one or more band-stop filters into the signal path, for example. "Band-stop filtering" refers to passing a signal through a filter having a gain that is less than a predetermined value within a predetermined contiguous "blocked" frequency range and greater than the predetermined value at some point above and below the predetermined frequency range. "Low-pass filtering" refers to passing a signal through a filter having a gain that is less than a predetermined value at all frequencies above a predetermined cutoff frequency and generally greater than the predetermined value below the predetermined cutoff frequency. One of ordinary skill will be able to incorporate and optimize digital or analog normalization and/or low-pass filters for use in the present invention, in light of the teachings below.

A "low order" filter is one that is less than 6th order, generally indicative of a low order of complexity and computational burden. A "real time" system refers to one that operates in an environment and that is triggered by events other than a master reset, such as a data read/write command. A "normal" read or write operation refers to any process initiated by a command relating to data storage or retrieval and facilitating the automatic execution thereof.

Figure 1:
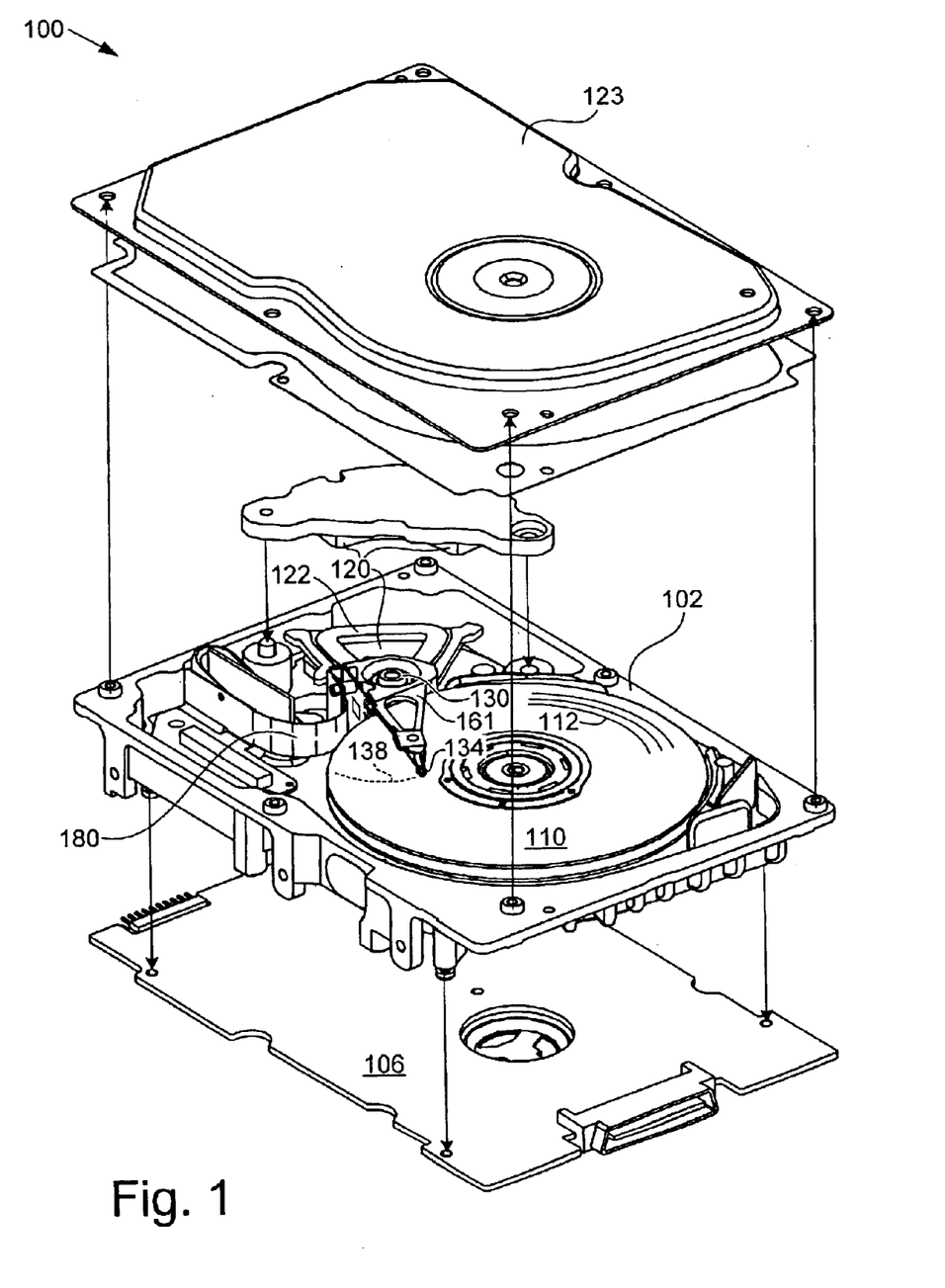
FIG. 1 shows a data storage device constructed in accordance with a preferred embodiment of the present invention.

Turning now to FIG. 1, there is shown a data storage device 100 constructed in accordance with a preferred embodiment of the present invention. Device 100 is a disc drive including base 102 to which various components are mounted. Top cover 123 cooperates with base 102 conventionally to form a sealed chamber. The components include a spindle motor which rotates data storage discs 110 at hundreds or thousands of revolutions per minute. Information is written to and read from tracks 112 on discs 110 through the use of an actuator assembly 161, which rotates during a seek operation about a bearing shaft assembly 130 positioned adjacent discs 110. Actuator assembly 161 includes a plurality of actuator arms which extend above and below each disc 110, with one or more flexures extending from each of the actuator arms. Mounted at the distal end of each of the flexures is a transducer head 134 which includes an air-bearing slider enabling transducer head 134 to fly in close proximity above the corresponding surface of associated disc 110.

Servo and user data travels through transducer head 134 and flex cable 180 to control circuitry on controller board 106. (Controller board 106 is optionally configured with circuits described below with reference to FIG. 3 or 10 and FIG. 11, and to perform the methods described below with reference to FIGS. 2 & 18 ). Flex cable 180 maintains an electrical connection by flexing as transducer heads 134 traverse tracks 112 along their respective radial paths 138. By "radial," it is meant that path 138 is substantially aligned with a radius of the disc(s) 110, although their directions may be offset from a perfectly radial direction by up to about 20 degrees due to head skew, as is understood in the art.

During a seek operation, the overall track position of transducer heads 134 is controlled through the use of a voice coil motor (VCM), which typically includes a coil 122 fixedly attached to actuator assembly 161, as well as one or more permanent magnets 120 which establish a magnetic field in which coil 122 is immersed. The controlled application of current to coil 122 causes magnetic interaction between permanent magnets 120 and coil 122 so that coil 122 moves. As coil 122 moves, actuator assembly 161 pivots about bearing shaft assembly 130 and transducer heads 134 are caused to move across the surfaces of discs 161 between the inner diameter and outer diameter of the disc(s) 161. Fine control of the position of head 134 is optionally made with a microactuator (not shown) that operates between the head 134 and the actuator arm(s).

Figure 2:
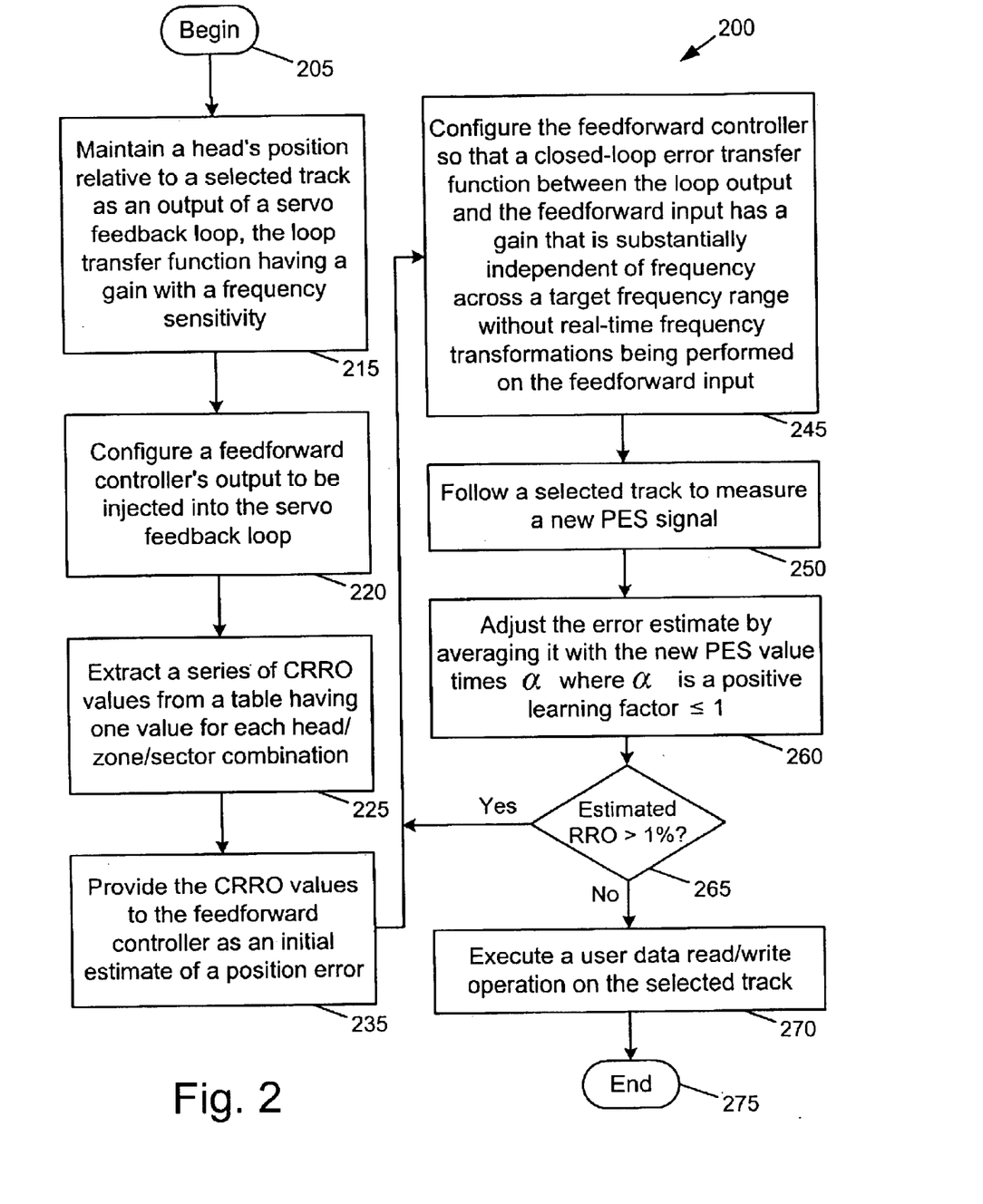
FIG. 2 shows a flowchart for a "PES-based" compensation method of the present invention.
Figure 10:
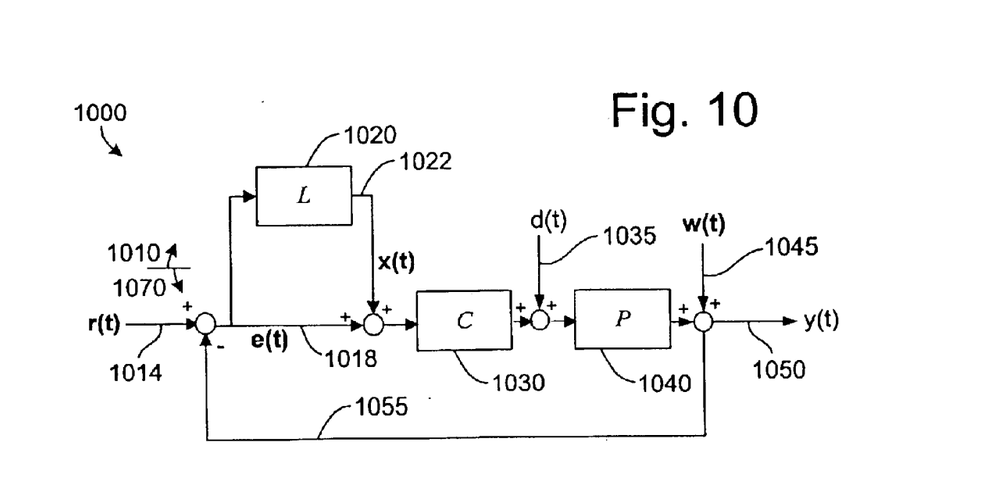
FIG. 10 is the block diagram of a hard disc drive (HDD) servo system with real-time adaptive RRO compensation of the present invention.

FIG. 2 shows a fairly simple method 200 for PES-based compensation of the present invention, comprising steps 205 through 275. (A corresponding block diagram is shown in FIG. 10) The head's position is maintained relative to a selected track as an output of a servo feedback loop 215, the closed-loop transfer function having a gain and phase with a frequency sensitivity. A feedforward controller's output is configured to be injected into the loop 220. A series of coherent RRO compensation values are extracted from a table having one value for each head/zone/sector combination 225. The CRRO compensation values from the table are provided to the feedforward controller as an initial CRRO compensation value 235. The controller is configured so that the feedforward closed-loop transfer function between the loop output and the feedforward input has a gain and phase that are substantially independent of frequency across a desired frequency range 245. A selected track is followed while a new PES signal is measured 250. The CRRO compensation table for the next revolution is adjusted by summing the table of the present revolution and the new PES signal passed through the feedforward filter times the update gain 260. If the PES signal with the CRRO compensation is not greater than an offtrack threshold 265 (a percentage of track width), the data read/write operation is carried out on the selected track 270.

Figure 3:
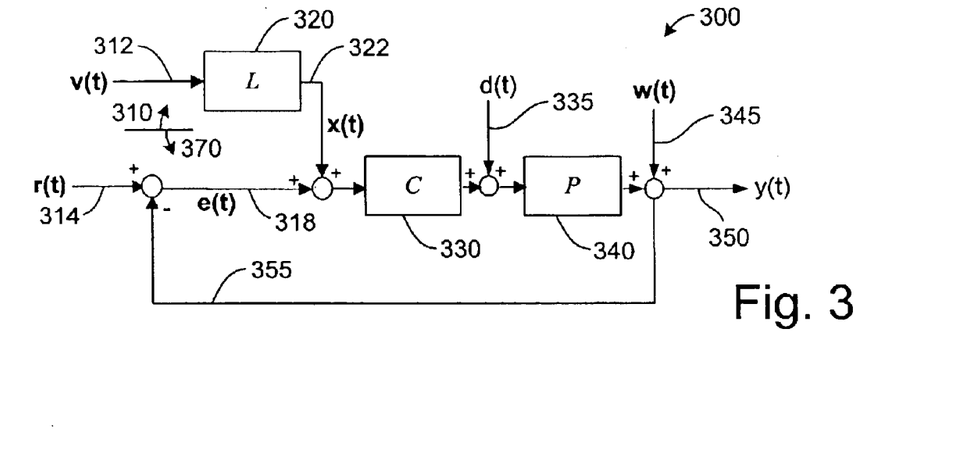
FIG. 3 is a block diagram of a servo system of the present invention configured to use repeatable runout (RRO) compensation that is RRO-based.

FIG. 3 is a block diagram of a servo system 300 of the present invention, configured to use RRO-based RRO compensation. System 300 includes a feedforward signal path 310 and a control loop 370. (As shown, control loop 370 has a conventional reference signal 314, loop controller $C(\omega)$ 330, plant disturbance 335, actuator $P(\omega)$ 340, head position 350, and measurement feedback signal 355.)

Feedforward controller $L(\omega)$ 320 includes a feedforward filter $F(\omega)$ and a delay of at least one revolution, not shown. Feedforward controller $L(\omega)$ 320 outputs a learned profile 322. A skilled artisan will recognize that the RRO $V(\omega)$ 312 in the PES $E(\omega)$ 318 is caused by written-in RRO $W(\omega)$ and that $$V(\omega) = \frac{-W(\omega)}{1 + P(\omega) \cdot C(\omega)} \quad (1)$$

The controller 320 can be simplified as $F(\omega)$ by assuming the input 312 is RRO $V(\omega)$ (as shown) and ignoring the delay of one revolution. Then the feedforward closed-loop transfer function is $$\frac{Y_v(\omega)}{V(\omega)} = T(\omega) \cdot F(\omega) \quad (2)$$

where $V(\omega)$ is RRO obtained by averaging PES sector by sector of several revolutions, $Y_v(\omega)$ is the response of feedforward input $V(\omega)$, excluding the response of written-in RRO $W(\omega)$ 345 as shown in FIG. 3, and $$T(\omega) = \frac{P(\omega) \cdot C(\omega)}{1 + P(\omega) \cdot C(\omega)} \quad (3)$$

is the closed-loop transfer function of feed back control system. (Note that system output 350 is $y(t)=y_v(t)-v(t)$.)

The residual RRO after RRO compensation if ignoring NRRO is $$E(\omega)=-Y(\omega)=V(\omega)-Y_v(\omega)=V(\omega)\cdot(1-T(\omega)\cdot F(\omega))$$

Therefore, the error function is $$S_z(\omega) = \frac{E(\omega)}{V(\omega)} = 1 - T(\omega) \cdot F(\omega) \tag{4}$$

In order to make the RRO compensation stable, the feedforward closed-loop transfer function $$|S_z(\omega)|=|1-T(\omega)\cdot F(\omega)|<1 \tag{5}$$

This is the stability criteria of the RRO compensation algorithm.

Ideally, $$F(\omega) = \frac{1}{T(\omega)}$$

so that the error is zero. (This is substantially the case of DFT-based follow ZAP.) DFT-based RRO compensation requires intensive computation, though. It is possible to design a feedforward controller that $$F(\omega) \approx \frac{1}{T(\omega)}.$$

Usually $F(\omega)$ is a high-order filter and can not run in real-time if $F(\omega)$ is obtained by fitting the inverse closed-loop transfer function of the feedback control system.

Figure 4:
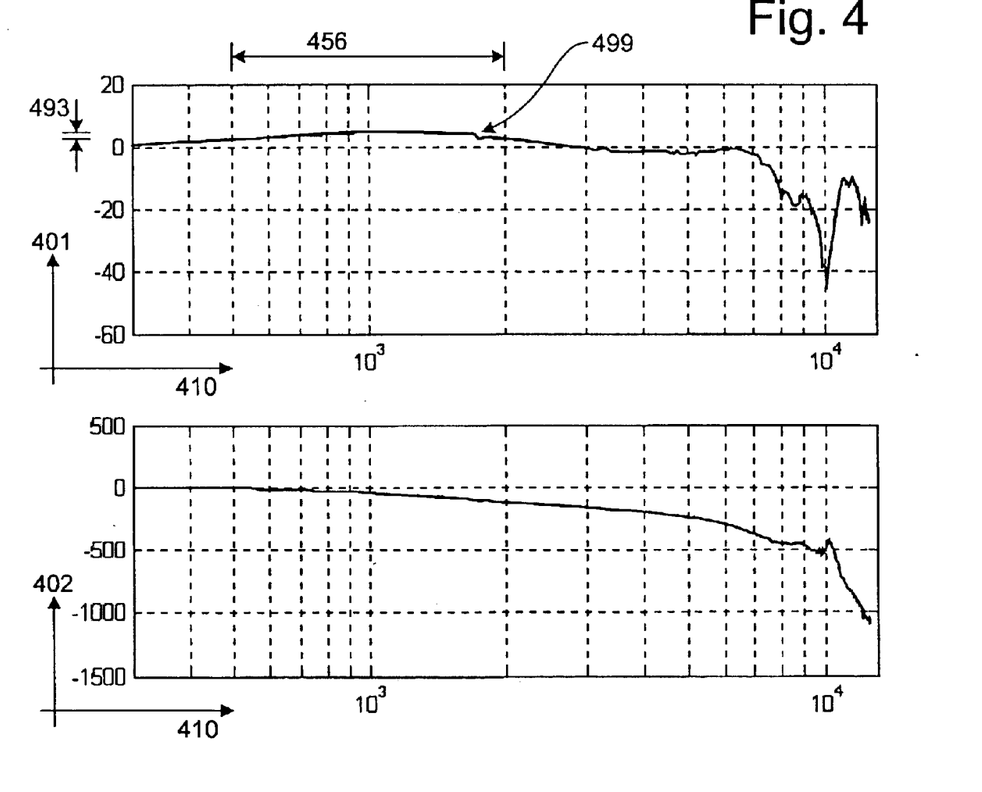
FIG. 4 shows a closed loop Bode plot of a feedback controller system of a Seagate drive having a frequency sensitivity.

FIG. 4 shows a closed loop Bode plot of a feedback controller system of a Seagate drive. Magnitude 401 (in decibels) and phase 402 (in degrees) are plotted against frequency 410 (in hertz). It will be appreciated by those in the art that magnitude 401 includes a frequency sensitivity 499 in desired frequency range 456. The frequency sensitivity has a variation range 493 of several decibels. Phase 402 likewise includes a frequency sensitivity in desired frequency range 456.

For a feedforward filter $F(\omega)$, if (1) the gain of the $F(\omega)$ $$|F(\omega)| \approx \left|\frac{1}{T(\omega)}\right| \tag{6}$$

and (2) the phase of $F(\omega)$ $$\angle(F(\omega)) \approx -\angle(T(\omega)) \tag{7}$$

This implies that $$\frac{Y_v(\omega)}{V(\omega)} = F(\omega) \cdot T(\omega) \approx 1 \tag{8}$$

Figure 5:
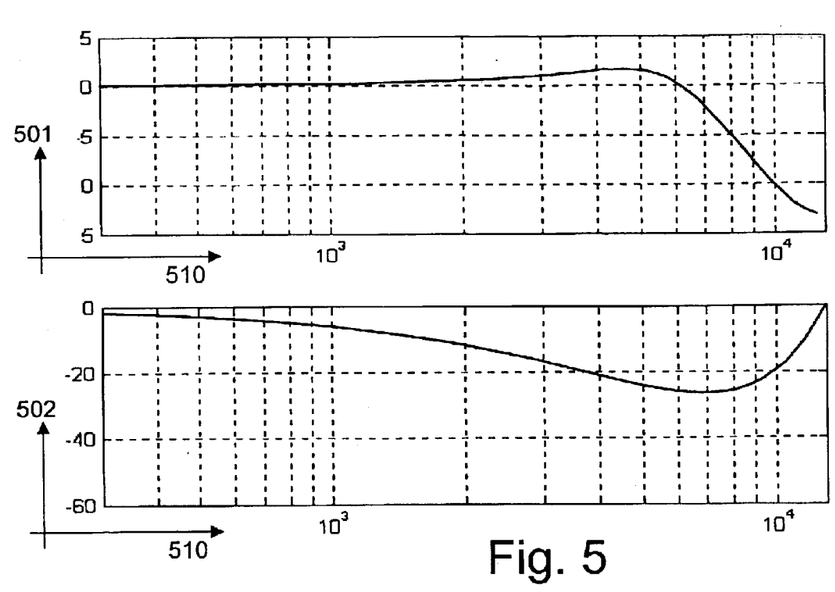
FIG. 5 shows a Bode plot of a suitable low-order low-pass filter that can be used in a feedforward controller of the present invention.

Since the head may move too fast if following the high frequency RRO, it is recommended that only the RRO components below a threshold frequency are compensated, higher frequency components being allowed to remain in the PES. FIG. 5 shows a Bode plot of a suitable low-order low-pass filter $Q(\omega)$ that can be used to remove the high frequency components from the estimated RRO (such as 312). Gain 501 (in decibels) and phase 502 (in degrees) are plotted against frequency 510 (in hertz). (Note that FIG. 5 shows a unity gain filter, but another baseline level of gain can be used as well, so long as the gain drops off by several decibels above a target frequency range.)

Figure 6:
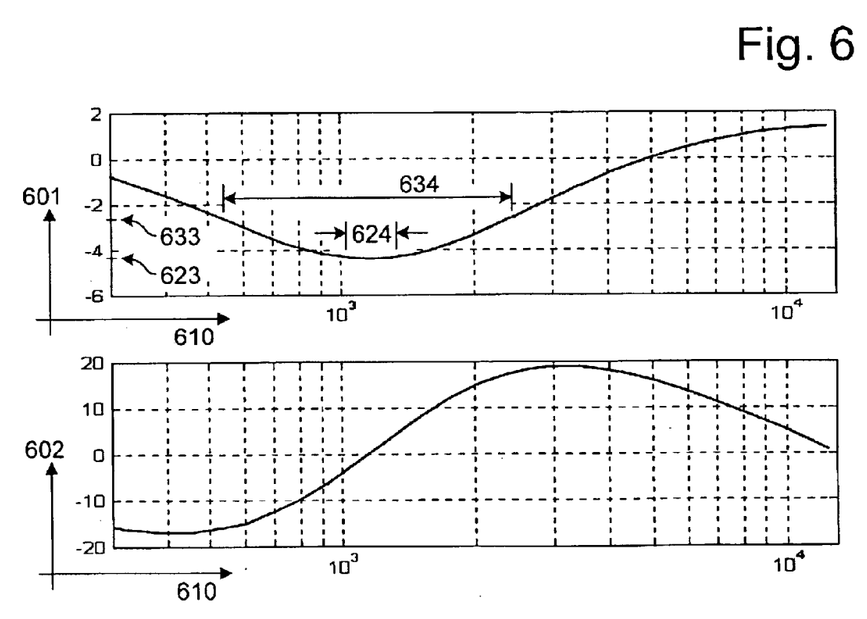
FIG. 6 shows a Bode plot of a suitable low-order normalization filter that can be used in a feedforward controller of the present invention.

In a preferred embodiment, the present invention uses a feedforward controller (such as 312) that also includes a normalization filter $N(\omega)$ configured to normalize $T(\omega)$. A Bode plot of one such normalization filter is shown in FIG. 6, which plots gain 601 (in decibels) and phase 602 (in degrees) against frequency 610 (in hertz). It is a second-order band-block filter. Gain 601 is below a first threshold 623 within a first "blocked" frequency range 624, and higher (at some point) above and below frequency range 624. As shown, gain 601 is also below a second threshold 633 within a second frequency range 634 and higher outside the range.

With low-pass filter and normalization filters, the feedforward closed-loop transfer function is $$\frac{Y_v(\omega)}{V(\omega)} = F(\omega) \cdot T(\omega) \approx Q(\omega) \cdot N(\omega) \cdot T(\omega) \tag{9}$$

Figure 7:
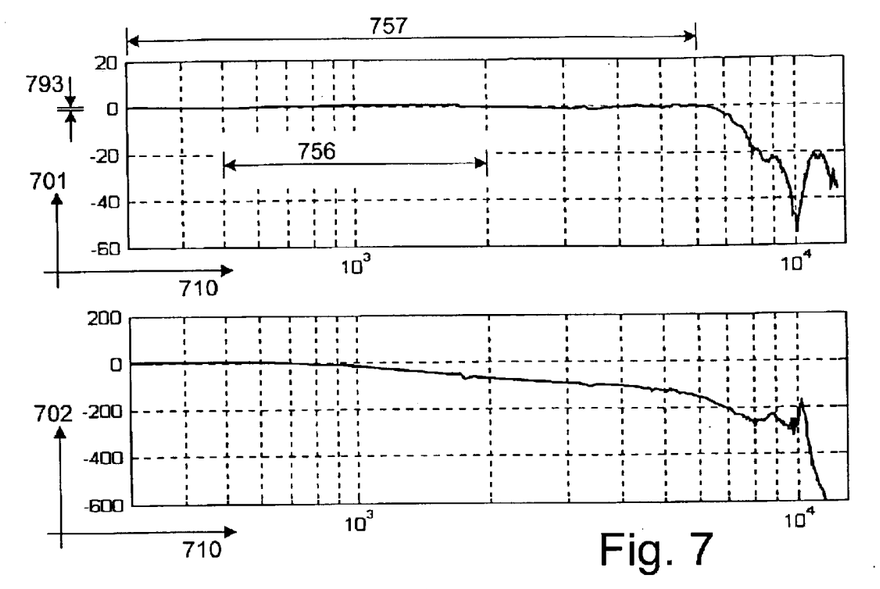
FIG. 7 shows a feedforward closed-loop Bode plot using the filters of FIGS. 5 & 6, without phase compensation.

The closed loop Bode plot in equation (9) is shown in FIG. 7. Gain 701 (in decibels) and phase 702 (in degrees) are plotted against frequency 710 (in hertz). With the low pass filter as shown in FIG. 5 and the normalization filter as shown in FIG. 6, feedforward closed-loop transfer function gain 701 does not vary substantially (and in fact varies only within a 1.4 decibel range 793) within a desired frequency range 757 of 0.3 kHz to 5 kHz. In another embodiment, feedforward closed-loop transfer function gain 701 does not vary substantially in a desired frequency range 756 of 0.5 kHz to 2 kHz.

It is observed from FIG. 7 that the feedforward closed-loop transfer function still has a phase 702 with a loss that generally increases with frequency 710. It is desirable to compensate for this phase loss so as to improve the RRO compensation efficiency and system stability in the frequencies that the phase loss is large.

Desirably, the RRO compensation starts in the next revolution after the RRO is obtained by averaging the PES sector by sector of the previous certain revolutions. There is a delay of at least one revolution between RRO computation and RRO compensation. With an overall delay in the feedforward signal path equal to the time required for one disc stack revolution, the feedforward closed-loop transfer function is $$\frac{Y_v(\omega)}{V(\omega)} = Q(\omega) \cdot N(\omega) \cdot T(\omega) \cdot \exp(-j\omega NT_s) \tag{10}$$

where $T_s$ is the sampling duration. When $$\omega = \frac{2\pi \cdot n}{NT_s},$$

i.e., at frequencies of spindle harmonics, where $n \in [0, N-1]$, N is the number of servo sectors of one revolution, it can be shown that $$\exp\left(-j\frac{2\pi \cdot n}{NT_s}NT_s\right) = 1 \tag{11}$$

In this case, the feedforward closed-loop transfer function at frequencies of spindle harmonics is $$\frac{Y_v\left(\frac{2\pi \cdot n}{NT_s}\right)}{V\left(\frac{2\pi \cdot n}{NT_s}\right)} = Q\left(\frac{2\pi \cdot n}{NT_s}\right) \cdot N\left(\frac{2\pi \cdot n}{NT_s}\right) \cdot T\left(\frac{2\pi \cdot n}{NT_s}\right) \tag{12}$$

However, If RRO compensation starts with less than 1 revolution of delay, i.e. the delay is N−m, where sector advance m≧0, then $$Y_v(\omega)=Q(\omega)\cdot N(\omega)\cdot T(\omega)\cdot V(\omega)\cdot \exp(-j\omega(N-m)\,T_s) \quad (13)$$

and considering the delay N−m, feedforward controller $$L(\omega) = Q(\omega)\cdot N(\omega)\cdot \exp(j\omega m T_s)\cdot \exp(-j\omega N T_s) \quad (14)$$
$$= F(\omega)\cdot \exp(-j\omega N T_s)$$

where $$F(\omega)=Q(\omega)\cdot N(\omega)\cdot \exp(j\omega m T_s) \quad (15)$$

Considering equation (11), the feedforward closed-loop transfer function at frequency of spindle harmonics is $$\frac{Y_v\left(\frac{2\pi\cdot n}{NT_s}\right)}{V\left(\frac{2\pi\cdot n}{NT_s}\right)} = Q\left(\frac{2\pi\cdot n}{NT_s}\right)\cdot N\left(\frac{2\pi\cdot n}{NT_s}\right)\cdot T\left(\frac{2\pi\cdot n}{NT_s}\right)\cdot \exp\left(\frac{j2\pi\cdot n\cdot m}{NT_s}\right) \quad (16)$$

The gain of feedforward closed-loop transfer function of equation (16) is the same as equation (9). However, there is a phase lead at all frequencies of spindle harmonics in equation (16). Since all RRO components are at frequencies of spindle harmonics, this phase lead at all frequencies of spindle harmonics generated by sector advance m compensates for a majority the phase loss of the feedforward closed-loop transfer function at all RRO frequencies. The phase lead generated by the sector advance is used to compensate for the phase loss at frequencies of spindle harmonics of the feedforward closed-loop transfer function including $T(\omega)$, $N(\omega)$ and $Q(\omega)$. Optionally, the sector advance m is about 1 to 10 sectors dependent on the phase loss of the selected normalization filter $N(\omega)$ and low-pass filter $Q(\omega)$.

Figure 8:
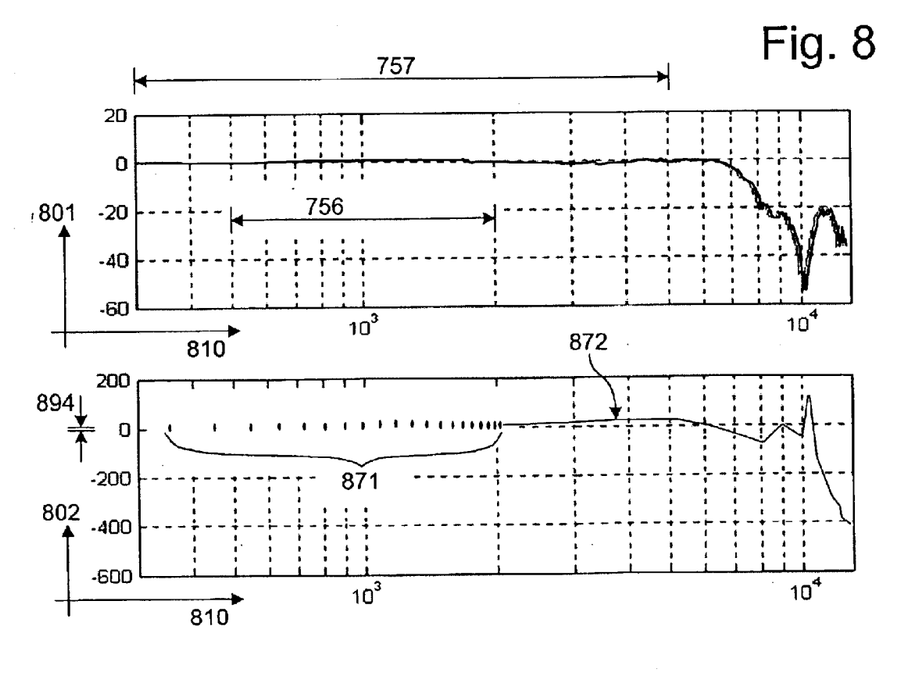
FIG. 8 shows a feedforward closed-loop Bode plot using a preferred feedforward controller of the present invention.

FIG. 8 is the gain 801 and phase 802 of the designed feedforward closed loop Bode plot, as a function of frequency 810. Gain 801 does not vary substantially within a desired frequency range 757. (The phase 802 shown in FIG. 8 holds only at frequencies of spindle harmonics.) Phase 801 is accurately represented as a series of points 871 at intervals equal to the spindle rotation frequency, but is partly shown approximately as a solid curve 872. For the designed feedforward controller in a Seagate drive, it can be observed with the normalization filter $N(\omega)$, low-pass filter $Q(\omega)$ and sector advance m, the gain variation of the closed loop Bode plot is ±0.7 db and its phase variation is ±6 degree in the desired frequency range 757 from 300 Hz to 5 kHz. Here m=3. Note that the phase above 9.5 kHz varies dramatically and it may cause stability problems. Therefore, another purpose served by the low-pass filter is to prevent the residual RRO at high frequencies from divergence by attenuating the high frequency components of RRO.

Figure 9:
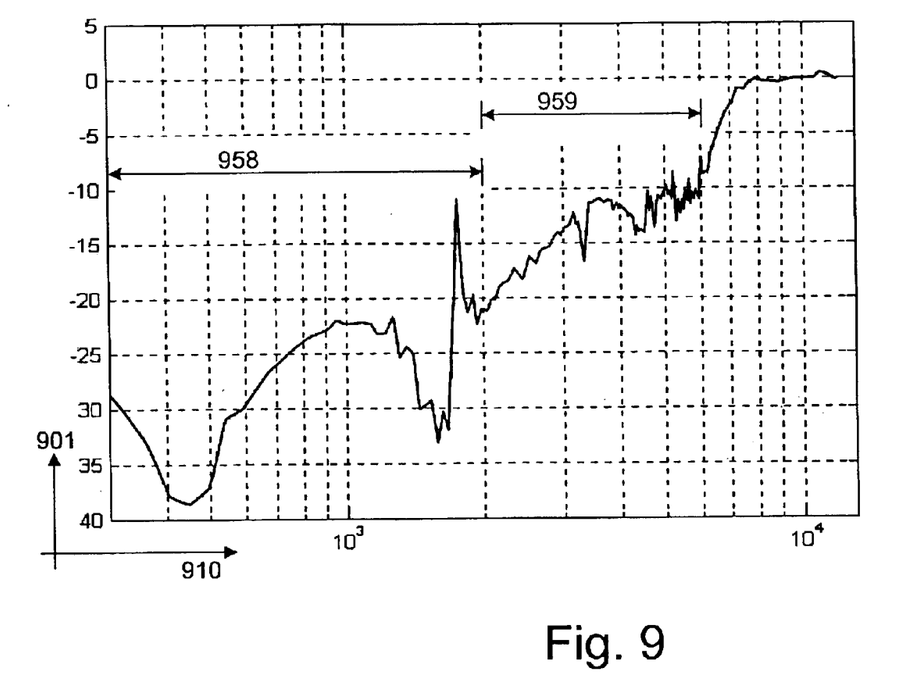
FIG. 9 shows a feedforward error function as a function of frequency with the feedforward controller used in FIG. 8.

FIG. 9 shows the feedforward error function 901 (in decibels) as a function of frequency 910 in (hertz) with the feedforward controller used in FIG. 8. (Note that error function 901 holds only at frequencies of spindle harmonics.) For the designed feedforward controller in a Seagate drive, the error from 300 Hz to 2 kHz (in range 958) is generally less than −20 db, and from 2 kHz to 6 kHz (in range 959) is less than −10 db. This indicates that the residual RRO after 1 iteration compensation reduced by at least about 90% from 300 Hz to 2 kHz and is reduced by at least 85% from 2 kHz to 6 kHz. The feedforward error function above 8 kHz is about 0 db. This means the RRO at high frequencies is removed because the high frequency components of RRO has been removed by the low-pass filter $Q(\omega)$.

FIG. 10 is the block diagram of a HDD servo system 1000 with real-time adaptive RRO compensation of the present invention, similar to system 300 of FIG. 3. It includes a feedforward signal path 1010 and a control loop 1070. (As shown, control loop 1070 has a conventional reference signal 1014, loop controller $C(\omega)$ 1030, plant disturbance 1035, actuator $P(\omega)$ 1040, written-in error 1045, head position 1050, and measurement feedback signal 1055.) Feedforward controller $L(\omega)$ 1020 includes a feedforward filter $F(\omega)$ and a delay of at least one revolution, not shown. Feedforward controller $L(\omega)$ 1020 outputs a learned profile 1022 based on PES 1018.

Figure 11:
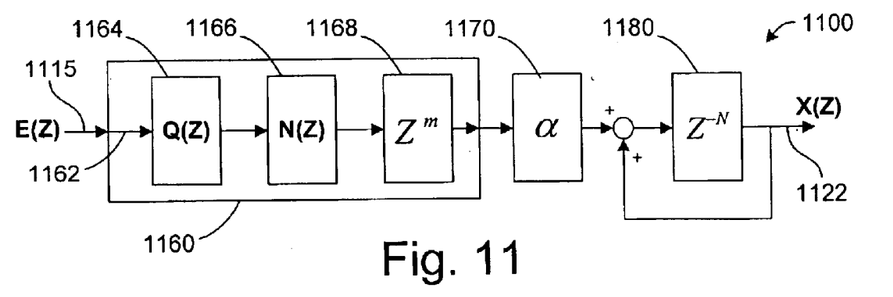
FIG. 11 shows a feedforward controller of the present invention in block diagram form

FIG. 11 shows a feedforward controller 1120 in block diagram form, suitable for RRO-based or PES-based real-time adaptive RRO compensation embodiments of the present invention. It includes a feedforward filter module 1160 receiving controller input 1115 along a signal path 1162 that passes through low pass filter 1164, normalization filter 1166 and sector advance filter 1168. The output from feedforward filter module 1160 passes through update filter 1170, summing element, and delay element 1180 in a feedback configuration as shown, generating controller output 1122. For "RRO-based" compensation, the input 1115 can be obtained conventionally, as residual RRO by averaging PES sector by sector of several revolutions and the update gain α=1 for update filter 1168. For "PES-based" compensation, the input $E(\omega)$ 1115 can be conventional raw PES, which includes both residual RRO and NRRO.

The feedforward error function of the adaptive RRO compensation can be obtained as follows, ignoring the NRRO in $E(\omega)$ for simplicity. Since the controller will be implemented in a discrete time system, the discrete transfer function is adopted in the description below.

According to FIG. 11, the feedforward controller for adaptive RRO compensation can be described by a transfer function as $$L(z) = \frac{X(z)}{E(z)} = \frac{\alpha\cdot F(z)\cdot z^{-N}}{1-z^{-N}} \quad (17)$$

Meanwhile, from FIG. 10, if ignoring NRRO, i.e., E(z) includes only the residual RRO, one gets $$(E(z)+X(z))\cdot C(z)\cdot P(z)+W(z)=-E(z) \quad (18)$$

Combining Equation (1), (3), (17), and (18), one gets $$E(z)=(1-\alpha\cdot F(z)\cdot T(z))\cdot z^{-N}E(z)+V(z)\cdot(1-z^{-N}) \quad (19)$$

since RRO V(z) is repeatable in all revolutions, one gets $$V(z)=V(z)\cdot z^{-N} \quad (20)$$

From equation (19) and (20), one gets the relationship between residual RRO in revolution k $E_k(z)$ and revolution k−1 $E_{k-1}(z)$:

$$E_k(z)=(1-\alpha\cdot F(z)\cdot T(z))\cdot E_{k-1}(z) \quad (21)$$

where k>0 and $E_0(z)=V(z)$

By recursion, one gets the error function of adaptive RRO compensation in the kth revolution as $$S_k(z) = \frac{E_k(z)}{V(z)} = (1 - \alpha \cdot F(z) \cdot T(z))^k \quad (22)$$

The criteria for convergence of the adaptive RRO compensation is $$|1-\alpha \cdot F(z) \cdot T(z)|<1 \quad (23)$$

In fact, since $0<\alpha<1$, the above criteria (23) is always tenable if the criteria for RRO compensation in (5) is satisfied. Equation (22) is suitable for RRO-based and PES-based real-time adaptive RRO compensation.

Furthermore, if a feedforward filter F(z) is designed to satisfy equation (8) in the desired frequency range, the feedforward error function of adaptive RRO compensation can be approximated as $$S_k(z) = \frac{E_k(z)}{V(z)} \approx (1 - \alpha)^k \quad (24)$$

From equation (24), it can be concluded that the larger $\alpha$ is, the faster the RRO converges.

The impact of NRRO in each revolution on PES-based real-time adaptive RRO compensation is analyzed as follows. For simplicity, written-in RRO W(z) and RRO V(z) are ignored in the derivation below. With the approach similar to the feedforward error function of the adaptive RRO compensation, one gets $$E_{kj}(z) = \alpha \cdot F(z) \cdot T(z) \cdot (1 - \alpha \cdot F(z) \cdot T(Z))^{k-j-1} \cdot B_j(z) \quad (25)$$

$$\approx \alpha \cdot (1 - \alpha)^{k-j-1} \cdot B_j(z)$$

where $B_j(z)$ is the NRRO of revolution j, $E_{kj}(z)$ is the residual RRO in revolution k induced by the NRRO of revolution j, $k>0$ and $0 \leq j<k$.

The total residual RRO $N_k(z)$ is the summation of the residual RRO induced by NRRO from revolution 0 to k−1, i.e., $$N(z) = \sum_{j=0}^{k-1} E_{kj}(z) \quad (26)$$

$$\approx \sum_{j=0}^{k-1} \alpha \cdot (1 - \alpha)^{k-j-1} \cdot B_j(z)$$

As well known, NRRO is usually regarded as a stationary random process and has following two properties:

The power of NRRO in any revolution is identical, i.e., the power in any j revolution is $$E(B_j^2(n)) = \frac{\sum_{n=0}^{N-1} B_j^2(n)}{N} = B^2 \quad (27)$$

where $B_j(n)$ is the NRRO of revolution j, $n \in [0, N-1]$ is servo sector, $E(\bullet)$ is mean function and B is a constant.

The NRRO is independent on each other in any revolutions, i.e., if $i \neq j$, $$E(B_i(n) \cdot B_j(n))=0 \quad (28)$$

Considering equation (26), (27) and (28), the power of the total residual RRO is $$N_k^2 = E(N_k^2(n)) \quad (29)$$

$$\approx \sum_{j=0}^{k-1} \alpha^2 \cdot (1 - \alpha)^{2(k-j-1)} \cdot B^2$$

$$= \frac{1 - (1 - \alpha)^{2k}}{1 - (1 - \alpha)^2} \cdot \alpha^2 \cdot B^2$$

If $k \to \infty$, the steady state power of total residual RRO is $$N_\infty^2 \approx \frac{\alpha}{2 - \alpha} \cdot B^2 \quad (30)$$

It can be observed from equation (30) that the impact of the NRRO on PES-based real-time adaptive RRO compensation is determined by the update gain $\alpha$ and the power of NRRO $B^2$. The smaller the update gain is, the smaller the total residual RRO induced by NRRO of previous revolutions.

According to equation (17), the adaptive RRO compensation table update equation is (1) when $n \geq m$ $$X(k+1,n-m)=X(k,n-m)+\alpha \cdot E(k,n)*Q(n)*N(n) \quad (31.1)$$

(2) when n<m $$X(k+1,N+n-m)=X(k,N+n-m)+\alpha \cdot E(k,n)*Q(n)*N(n) \quad (31.2)$$

where k is an iteration index, n is a servo sector number, m is a sector advance, and * indicates a convolution operation.

For RRO-based adaptive RRO compensation, E(k,n) is residual RRO at sector n in iteration k obtained by averaging raw PES sector by sector of a certain number of revolutions and update gain $\alpha=1$. For PES-based real-time adaptive RRO compensation, E(k,n) is raw PES at sector n of revolution k and update gain $0<\alpha \leq 1$.

Figure 12:
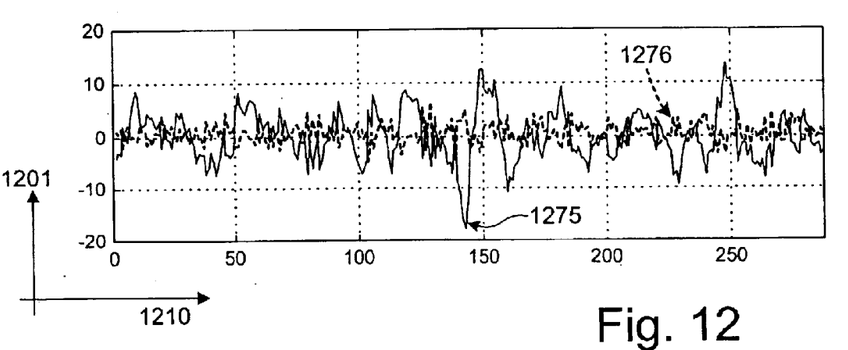
FIG. 12 is the residual RRO after one iteration of RRO-based adaptive RRO compensation as implemented in a Seagate disc drive, comparing with RRO without such compensation.

FIG. 12 is the residual RRO 1275 after one iteration of RRO-based adaptive RRO compensation as implemented in a Seagate disc drive, comparing with RRO 1276 without such compensation. Distance (in percents of a nominal track width) 1201 is plotted against sector number 1210. (Note that update gain $\alpha=1$.)

Figure 13:
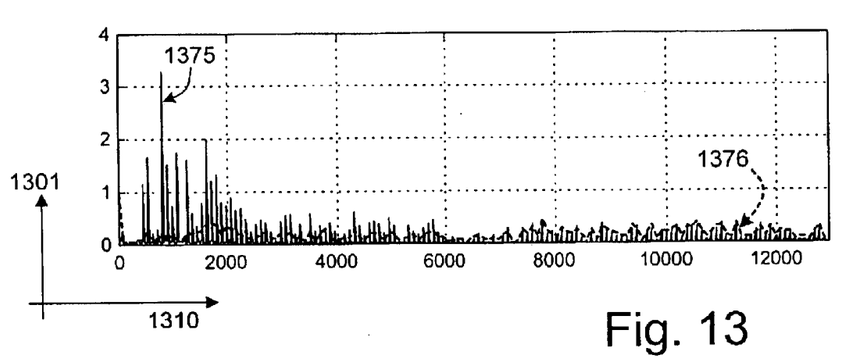
FIG. 13 shows the PES RRO versus frequency using the same data as was used in FIG. 12, with and without RRO-based adaptive RRO compensation.

FIG. 13 shows the PES RRO 1301 (in percents of a nominal track width) versus frequency in hertz 1310 using the same data as was used in FIG. 12, with and without RRO-based adaptive RRO compensation. Residual RRO 1376 after compensation is reduced by about 90% for frequencies below 2 kHz, as compared with its uncompensated distribution 1375. This is consistent with the error function in FIG. 9.

Figure 14:
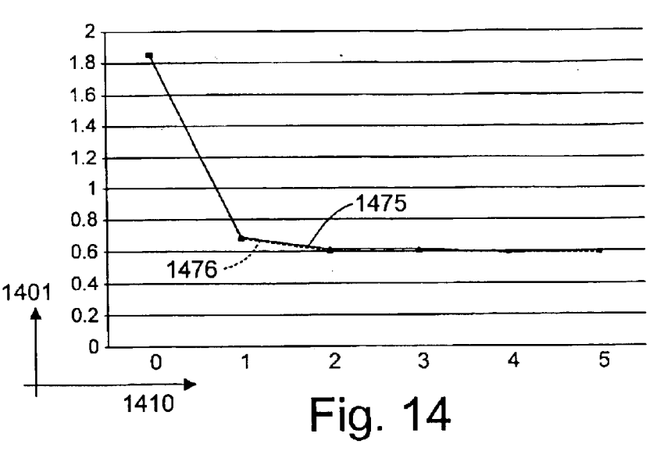
FIG. 14 shows that a real-time adaptive RRO compensation of the present invention performs about as well as conventional off-line RRO compensation, for a given number of iterations.

FIG. 14 shows the residual RRO in each iteration of both an RRO-based adaptive RRO compensation of the present invention (i.e. 1476) and conventional off-line RRO compensation by Digital Fourier Transform (i.e. 1475). RRO is plotted as a percent of a nominal track width 1401 versus iterations 1410. Note that the convergence rate and steady state residual RRO is virtually identical in these two RRO compensation algorithms.

Figure 15:
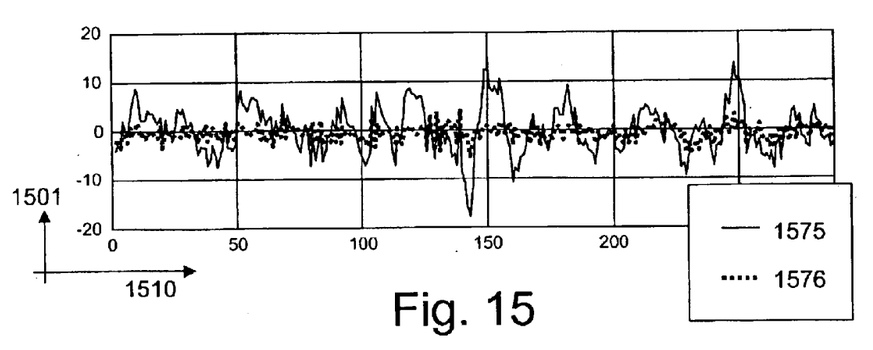
FIG. 15 shows residual RRO versus sector number, with and without RRO compensation of the present invention.

FIG. 15 shows residual RRO 1501 (in percents of a nominal track width) versus sector number 1510. Uncompensated RRO 1575 is compared to compensated RRO 1576 with 16 revolutions of PES-based real-time adaptive RRO compensation and update $$\alpha = \frac{1}{8}.$$

Figure 16:
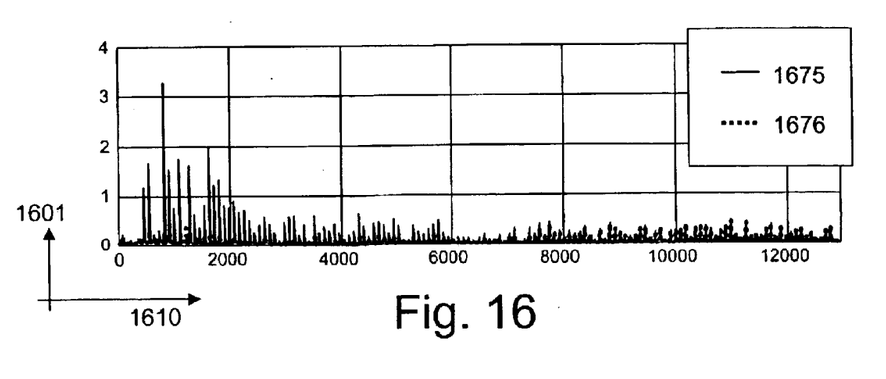
FIG. 16 shows residual RRO versus frequency with and without RRO compensation, using the same data as that used to derive FIG. 15.

FIG. 16 shows residual RRO 1601 (in percents of a nominal track width) versus frequency 1610 using the same data as that used to derive FIG. 15. Comparing uncompensated RRO 1675 with compensated RRO 1676, it can be seen that RRO below 6 kHz is reduced by about 90% by the PES-based compensation. This is a similar degree of improvement as that shown in FIGS. 12–13.

Figure 17:
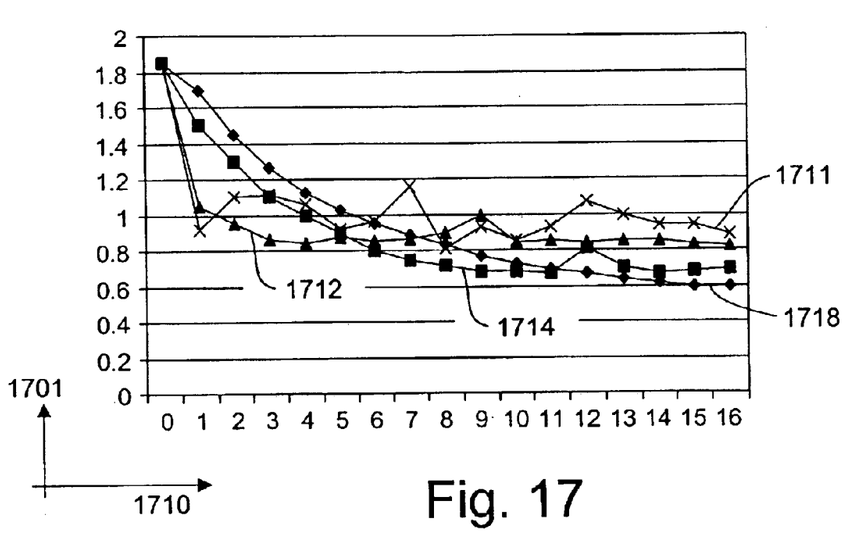
FIG. 17 shows a relationship between convergence rate and update gain in PES-based real-time adaptive RRO compensation of the present invention.

FIG. 17 shows the relationship between convergence rate and update gain in PES-based real-time adaptive RRO compensation. Residual RRO 1701 is plotted as a function of iteration number 1710 for various values of update gain $\alpha$. For $\alpha=1$, RRO is plot 1711. For $\alpha=\frac{1}{2}$, RRO is plot 1712. For $\alpha=\frac{1}{4}$, RRO is plot 1714. For $\alpha=\frac{1}{8}$, RRO is plot 1718.

It can be observed that the residual RRO converges faster to its steady state value with higher update gain while it converges slower to its steady state value with lower update gain. On the other hand, the residual RRO of steady state value with a smaller update gain is smaller than that with larger update gain. It is consistent with the conclusion from equation (24) and (30). In a preferred embodiment of the present invention, the update gain begins at $\alpha=1$ and is reduced by half on each fourth iteration.

Figure 18:
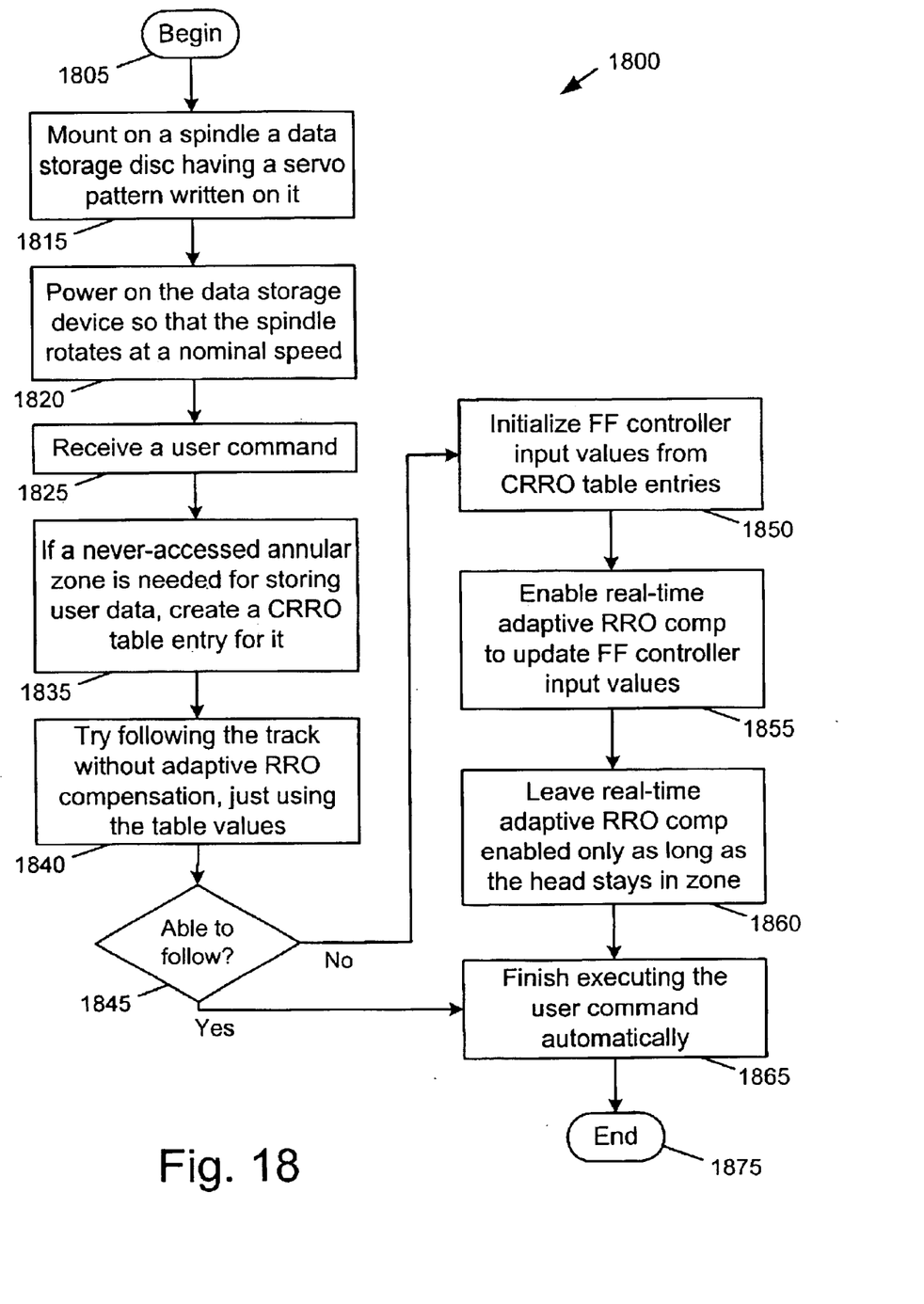
FIG. 18 is a method of the present invention suitable for use with the method of FIG. 2.

FIG. 18 is a narrow embodiment of the present invention, a method 1800 comprising steps 1805 through 1875. A data storage disc is provided with a servo pattern written on it, and mounted on a spindle 1815. In industry certification, the initial CRRO compensation table entries for each zone are generated and stored in the media. The initial table entries for the testing zone are obtained by averaging the CRRO compensation tables of the selected tracks in the zone. The data storage device is powered on so that the spindle rotates at a nominal speed 1820. The initial CRRO compensation table entries for each zone are retrieved from the media and stored in the buffer memory. In normal read/write operation, a user command is received 1825. A CRRO table is updated/created 1835 and a selected track is followed with RRO compensation from the table's initial value but without further real-time adaptive RRO compensation 1840. If the initial table values are not effective 1845, the feedforward controller is enabled with feedforward values from the CRRO table 1850. The selected track is re-read several times, updating the CRRO table 1855. Real-time adaptive RRO compensation remains enabled until the head leaves the zone 1860. In this manner, the user read/write command is executed automatically. Note that steps after 1825 are repeated, if the first user command requires data read/write operations in more than one zone.

Alternatively characterized, a first embodiment of the present invention is a data handling system including a disc stack configured to rotate at a predetermined spindle rotation speed, the predetermined speed defining a multiplicity of spindle harmonic frequencies. The system also includes a transducer head (such as 134) having a position relative to the disc stack. The system also includes a servo feedback loop configured to control a loop output (i.e. the head's position) based on a loop input (such as 314,1014) according to a predetermined feedback closed-loop transfer function having a gain with a frequency sensitivity. The system also includes a feedforward controller configured to generate a feedforward output based on a feedforward input. The feedforward input is indicative of a repeatable error (such as a measured PES signal or calculated RRO estimate) in the transducer head's position. The feedforward output is injected into the servo loop so as to define a feedforward closed-loop transfer function between the loop output and the feedforward input. The feedforward controller includes a feedforward filter module configured to counteract the frequency sensitivity enough so that the feedforward closed-loop transfer function has a gain that remains within a predetermined variation range of at most about 6 decibels throughout a desired frequency range that is wider than one order of magnitude. Moreover the phase preferably remains within a predetermined variation range throughout the desired frequency range. The "variation range" is optionally vector-valued.

In a second alternative embodiment, a feedforward controller of the present invention includes a low-order low-pass filter and a low-order digital normalization filter. The low-pass filter is configured to attenuate the feedforward output at all frequencies higher than 9.5 kilohertz. The band stop filter has a predetermined "stopped" or "blocked" frequency range that is within the desired frequency range.

In a third alternative embodiment, a feedforward controller of the present invention includes a delay element configured to insert a signal delay corresponding to about N–m servo sectors into the feedforward output, where N is a nominal number of sectors in a nominal track of the disc stack and m is a sector advance greater than zero and at most 10.

A fourth alternative embodiment of the present invention is a method of using a repeatable runout compensation system. It includes steps of rotating a disc stack at a controlled speed, arranging a servo feedback loop having a transfer function gain with a frequency sensitivity, and configuring a feedforward controller so that the feedforward controller counteracts the frequency sensitivity enough so that the feedforward closed-loop transfer function has a gain and phase that remain stable across a desired frequency range. Within the desired range, the gain desirably remains within a 6 decibel variation range, more preferably within a 3 decibel range, and most preferably within a 1.4 decibel range. Likewise, the phase desirably remains within a 90 degree variation range, more preferably within a 20 degree range, and most preferably within a 6 degree range. The feedforward controller preferably includes a delay element configured to insert a signal delay corresponding to a rotation of about N–m servo sectors into the feedforward output, where N is a nominal number of sectors in a nominal track of the disc stack, m is a sector advance greater than zero.

In a fifth alternative embodiment, a method of the present invention further includes a step of mounting (preferably on a spindle) a data storage disc having a servo pattern written thereon. A user command is received and automatically executing it without performing any real-time frequency transformations.

In a sixth alternative embodiment, a method of the present invention includes a step of deriving the feedforward input based on a scalar multiple update gain <1 of a position error sense signal. The selected track is then followed again with the derived input to generate an updated PES signal. The method further includes a step of measuring whether enough of the error has been compensated for reliable track following.

In a seventh alternative embodiment, a method of the present invention includes a step of following each of several selected tracks on a data surface with a zone-dependent runout compensation model. It also includes a step of creating or updating a zone-dependent runout compensation model based on the feedforward input, the feedforward input being an estimate of a repeatable runout signal.

All of the structures and methods described above will be understood to one of ordinary skill in the art, and would enable the practice of the present invention without undue experimentation. It is to be understood that even though numerous characteristics and advantages of various embodiments of the present invention have been set forth in the foregoing description, together with details of the structure and function of various embodiments of the invention, this disclosure is illustrative only. Changes may be made in the details, especially in matters of structure and arrangement of parts within the principles of the present invention to the full extent indicated by the broad general meaning of the terms in which the appended claims are expressed. For example, one of ordinary skill would recognize that the feedforward path output of the present invention may be injected in the servo feedback loop in other ways. In addition, although the preferred embodiments described herein are largely directed to fixed magnetic media like the discs 110 of FIG. 1, it will be appreciated by those skilled in the art that many teachings of the present invention can be applied in other contexts, such as optical and/or removable data storage media, without departing from the scope and spirit of the present invention.

What is claimed is:

1. An apparatus comprising:
    a servo feedback loop configured to control a loop output based on a loop input according to a predetermined feedback closed-loop transfer function having a gain with a frequency sensitivity, the loop output being a sensor position, the loop input being a reference signal; and
    a feedforward controller configured to generate a feedforward output based on a feedforward input, the feedforward input being indicative of a repeatable error in the sensor position, the feedforward output being injected into the servo loop so as to define a feedforward closed-loop transfer function between the loop output and the feedforward input, the feedforward controller including a module configured to counteract the frequency sensitivity enough so that the feedforward closed-loop transfer function has a gain that remains within a predetermined 6 decibel range and/or has a phase that remains within a predetermined 90 degree range throughout a substantial desired frequency range.

2. The data handling system of claim 1 in which the feedforward filter module includes a band-stop filter configured to generate the feedforward output, the band-stop filter having a predetermined stopped frequency range that is within the desired frequency range.

3. The data handling system of claim 1 in which the gain of the feedforward closed-loop transfer function remains within a predetermined 3 decibel range throughout the desired frequency range.

4. The data handling system of claim 1 in which the gain of the feedforward closed-loop transfer function remains within a predetermined 1.4 decibel range throughout the desired frequency range.

5. The data handling system of claim 1 in which the feedforward controller also includes a delay element configured to insert a signal delay corresponding to a rotation of about N−m servo sectors into the feedforward output, where N is a nominal number of sectors in a nominal track of the disc stack, m is a sector advance greater than zero.

6. The data handling system of claim 5 in which m is at most 10.

7. The data handling system of claim 1 in which the predetermined frequency range is at most 9 kilohertz.

8. The data handling system of claim 1 in which the predetermined frequency range is at least 180 hertz.

9. The data handling system of claim 1 in which the feedforward filter module is a digital band-stop filter.

10. The data handling system of claim 1 in which the feedforward filter module is a band-stop filter having an order lower than sixth.

11. An apparatus comprising:
    a servo feedback loop configured to control a loop output based on a loop input according to a predetermined feedback closed-loop transfer function having a gain with a frequency sensitivity; and
    a feedforward controller configured to generate a feedforward output based on a feedforward input, the feedforward input being indicative of a repeatable error in the loop output, the feedforward output being injected into the servo loop so as to define a feedforward closed-loop transfer function between the loop output and the feedforward input, the feedforward controller including a module configured to counteract the frequency sensitivity enough so that the feedforward closed-loop transfer function has a normalized gain and/or a normalized phase throughout a substantial desired frequency range.

12. The data handling system of claim 11, further comprising a feedforward controller that does not include any element having a polynomial order higher than fifth, configured to generate the normalized gain.

13. The data handling system of claim 11, further comprising a gain-normalizing means including a band-stop filter having an order lower than sixth.

14. The data handling system of claim 11 further including a signal path passing through a gain-normalizing means and through a delay element, in which the delay element is configured to inject a partial-revolution delay.

15. The data handling system of claim 11, further comprising a gain-normalizing means effective in keeping an error transfer function gain within a predetermined 3 decibel range throughout a predetermined frequency range larger than two orders of magnitude.

16. The data handling system of claim 15 in which the gain-normalizing means is a feedforward controller that does not perform any frequency transformations.

17. A method comprising steps of:
    (a) controlling a loop output partially based on a loop input according to a predetermined feedback closed-loop transfer function having a gain with a frequency sensitivity; and
    (b) generating a feedforward output partially based on a feedforward input, so that the feedforward input is indicative of an error in the loop output, so that the feedforward output is used to define a feedforward closed-loop transfer function between the loop output and the feedforward input, and so that the frequency sensitivity is counteracted enough so that the feedforward closed-loop transfer function has a normalized gain and/or a normalized phase throughout a predetermined contiguous frequency range that spans several harmonics.

18. The method of claim 17 further including a step (c) of creating a zone-dependent runout compensation model based on the feedforward input.

19. The method of claim 17 further including steps of:
    (c) receiving a user command; and
    (d) automatically executing the user command of the receiving step (c) by using the loop output of the arranging step (a) and the sensitivity counteracted in the configuring step (b).

20. The method of claim 17 in which the configuring step (b) is performed so that at least some of the feedforward input never undergoes any frequency transformation.

21. The method of claim 17 further including a prior step of mounting a data storage disc having a servo pattern written thereon on a spindle.

22. The method of claim 17 further including a step (c) of verifying that a repeatable component of the error in the loop output does not exceed a predetermined threshold.

23. The method of claim 17 in which the configuring step (b) includes a step (b1) of deriving the feedforward input based on a scalar multiple of a position error sense signal.

24. The method of claim 17 in which the configuring step (b) includes a step (b1) of receiving the feedforward input as an estimate of a repeatable runout signal.

25. The method of claim 17 further including a step (c) of following each of several selected tracks on a data surface of a disc stack while using a zone-dependent runout compensation model.

26. The method of claim 17 further including a step (c) of updating a zone-dependent runout compensation model based on the feedforward input.

27. The method of claim 17 in which the configuring step (b) includes steps of:
  (b1) following a selected track while generating a preliminary position error sense (PES) signal;
  (b2) filtering the preliminary PES signal with an update gain <1;
  (b3) following the selected track again while using the filtered PES signal and generating an updated PES signal; and
  (b4) receiving the feedforward input as the updated PES signal.

28. A method comprising steps of:
  (a) controlling a loop output partially based on a loop input according to a predetermined feedback closed-loop transfer function having a gain with a frequency sensitivity, the loop output being a relative position; and
  (b) generating a feedforward output based on a feedforward input, so that the feedforward input is indicative of an error in the relative position, so that the feedforward output is used to define a feedforward closed-loop transfer function between the loop output and the feedforward input, and so that the frequency sensitivity is counteracted enough so that the feedforward closed-loop transfer function has a gain that remains within a predetermined 6 decibel range and/or has a phase that remains within a predetermined 90 degree range throughout a predetermined contiguous frequency range that spans several harmonics.

* * * * *